United States Patent [19]

Strauss et al.

[11] 3,758,706
[45] Sept. 11, 1973

[54] INSULATED COILS FOR ELECTRICAL MACHINES
[75] Inventors: Edmar Strauss; Siegfried Foth; Hans-Jürgen Kaltschmidt, all of Berlin, Germany
[73] Assignee: Licentia Patent-Verwaltungs-GmbH, Frankfurt am Main, Germany
[22] Filed: Apr. 3, 1972
[21] Appl. No.: 240,639

[30] Foreign Application Priority Data
Apr. 3, 1971 Germany.................. P 21 17 016.1

[52] U.S. Cl. ........................... 174/120 SR, 310/260
[51] Int. Cl. ............................................... H01b 7/02
[58] Field of Search ................. 174/120 R, 120 SR; 310/260; 29/602; 1/605

[56] References Cited
UNITED STATES PATENTS
3,436,815  4/1969  Sheets............................ 174/120 R
3,454,807  7/1969  Ganger........................... 174/120 R Primary Examiner—E. A. Goldberg
Attorney—George H. Spencer et al.

[57] ABSTRACT

An insulated conductor or conductor bundle for electrical machines wherein the portion of the conductor or conductor bundle which is to be installed in the grooves of a lamination packet of the machine, is enclosed with an insulation material containing mica which is bound with a high percentage by weight of binder, while the arm portion of the conductor or conductor bundle is enclosed with an insulation material containing only mica or mica bound with a low percentage by weight of binder.

8 Claims, 1 Drawing Figure

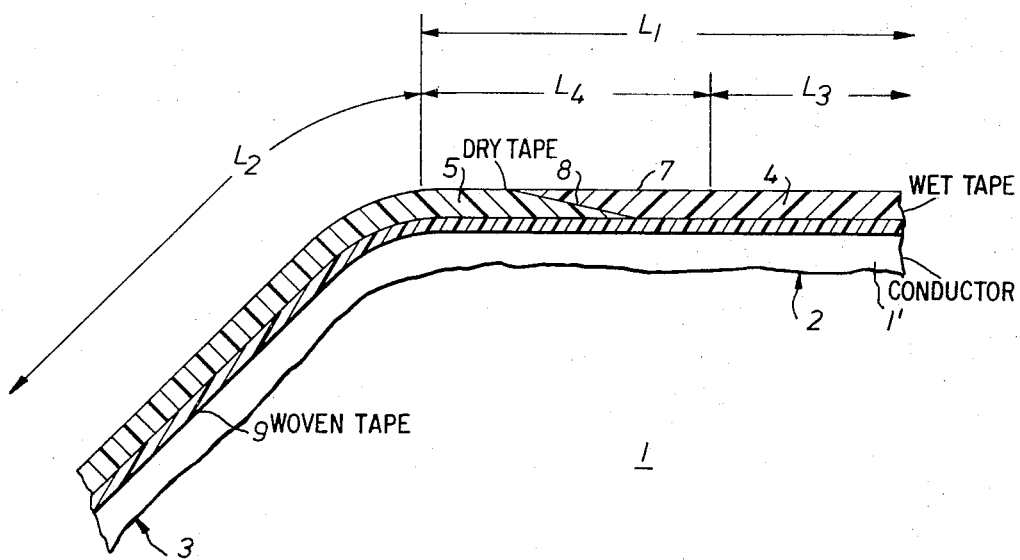

INSULATED COILS FOR ELECTRICAL MACHINES

BACKGROUND OF THE INVENTION

The present invention relates to the insulation of coils formed of conductors or conductor bundles, respectively, for electrical machines, and to a method of insulating electrical coils, in which the conductors or conductor bundles are surrounded by a mica-containing insulating material, are then installed in the machine, inpregnated with an impregnating resin, and thereafter hardened.

Particularly with respect to high voltage rotating machines, the conductors or conductor bundles are to an increasing degree being insulated by enclosing them in an insulating material, inserting them into the lamination packet or stator grooves without impregnation, and then impregnating the assembled coil and iron lamination packet, e.g. by immersion into an impregnating resin.

The insulating material which is wound around the conductors or conductor bundles is usually in the form of a so-called "dry tape," which consists of a carrier material, such as paper, rayon, polyester fleece, or glass silk, for example, and fine mica without a binder, e.g. a resin, or fine or split mica, with as small a binder content as possible, for example, about 3 to 8 percent by weight, which binder serves only to adhere the carrier material to the mica during fabrication.

Although such tapes or bands are relatively absorbent, it has been found that perfect impregnation of the portion of the conductors or conductor bundles in the grooves of the lamination packet with an impregnating resin, such as for example, an epoxy or polyester resin produces difficulties in spite of the use of vacuum pressure impregnation, particularly for larger groove lengths. This is the case particularly when, for example, an impregnating resin containing an accelerator-containing impregnating resin is used whose reduction in viscosity cannot be set extremely low by increases in temperature during the impregnation process. The storage time at room or lower temperatures is greatly reduced by the intermittent heating, so that the process is uneconimical.

SUMMARY OF THE INVENTION

It is therefore, a primary object of the present invention to provide an insulated coil and a method of insulating such coils in which the coil impregnation is significantly improved even for the insulating material disposed within the grooves of the lamination packet, so that the above-mentioned difficulties are substantially eliminated.

This object as well as others are accomplished according to the present invention by the provision of a coil in which the portion of the conductors or conductor bundles which come to lie within the grooves of the lamination packet of the machine is provided with an insulating material which contains mica bound with a large percentage by weight of binder and in which the coil ends and/or arm portions are provided with an insulating material which contains only mica or mica bound with a low percentage by weight of binder; and to a method of insulating such coils.

For the sake of clarity, the insulating material which has a high percentage by weight of binder shall be referred to hereinafter as "wet tape," while the insulating material having substantially no binder or a low percentage by weight of binder shall be referred to hereinafter as "dry tape."

The "wet tape," which may have any desired width, has a binder content of approximately 30 to 50 percent by weight. Thus a uniformly distributed resin binder is already available in sufficient quantity in the area of the lamination packet of the machine before the impregnation process.

The binder contained in the wet tape and the impregnating resin used for the impregnation, for example a saturation resin, are so adapted to one another that they chemically react well together and have the same process characteristics such as hardening time, hardening temperature, and simultaneous reaching of the minimum in vicosity during the hardening process, for example.

According to the present invention there is provided a very advantageous, homogeneous coil insulation for high voltage purposes both in the area of the lamination packet of the machine as well as in the coil end or arm portions. A long lamination packet groove does not constitute a drawback for this type of insulation.

Thus all points of the coil including that portion in the lamination packet of the machine are uniformly impregnated, coated and hardened so that a perfect seal for the coil and of the lamination packet is obtained. As a result, the use of accelerator-containing insulating tapes is no longer required, and the insulating materials for the switching connections, detours etc. need no longer be selected with a view toward the proportion of accelerator used since the accelerator can now be provided in the impregnating resin without shortening the storability time due to the elimination of the otherwise required high increase in temperature.

A further advantage of the present invention is that the percentage of accelerator proportion in the impregnating resin can easily be kept accurately constant, in contrast to the difficulty encountered in maintaining a uniform accelerator distribution in the accelerator-containing insulating tape. Thus the reactions of the impregnating resin can also be unequivocally predetermined.

BRIEF DESCRIPTION OF THE DRAWING

The FIGURE schematically illustrates a partial longitudinal sectional view of a top portion of the coil according to the present invention in which both the "wet tape" and "dry tape" portions are shown together with a transition zone of the coil.

DESCRIPTION OF THE PREFERRED EMBODIMENTS

A portion of a coil 1 for an electrical machine as illustrated in FIG. 1 shows part of a conductor or conductor bundle 1' and only a cut-away part of the insulation for the sake of clarity. The coil 1 has a first or core portion 2 which extends for a length $L_1$ and a coil end or arm portion 3 which extends for a length $L_2$. A part of the core portion 2 of the coil comes to lie within the grooves of a lamination packet of the machine (not shown). This part of the core portion has a length $L_3$. A transition zone having a length $L_4$ is situated between the part of the core portion 2 having a length $L_3$ and the coil end or arm portion 3 which has a length $L_2$. The transition zone forms part of the core portion 2.

According to the present invention, a wet tape 4 is wound around the core portion 2 over the length $L_3$ while the coil end or arm portion 3 has a dry tape 5 wound around it over the length $L_2$. The transition from dry tape to wet tape advisably takes place in a transition zone or core discharge area 7 which has a length $L_4$. In order to assure a uniform transition, the contact line 8 from dry tape 5 to wet tape 4 is formed during the course of wrapping about the arm portion 3 and core portion 2, respectively. That is these tapes are wound so that subsequent layers thereof are offset with respect to each other.

It is advantageous, as shown in the drawing, if a woven tape of insulating material is wrapped around the entire conductor or conductor bundle 1 before the application of the insulating material 4 and 5. If it is intended to preliminarily prepress the core portion 2 over the length $L_1$, the woven tape 9 may be eliminated at the core portion 2.

Generally, the wet tape 4 is prepressed or tensioned directly before and during the installation of the coil in the machine in order to obtain a good packing of the binder.

After installation of the coil and during the impregnation, e.g. during a vacuum pressure impregnation, the impregnating resin can penetrate into the area of the wet tape 4 due to the valve effect of the dry tape 5 and the wick effect of the woven tape 9. The quantity of impregnating resin which would otherwise be required for a dry tape is by far not as high when wet and dry tape are used because the high proportion of binder in the wet tape serves as a certain percentage of the needed resin. Thus it is assured in any case that sufficient resin is present in the core portion of the conductor or conductor bundle, which is under a high dielectric stress, so that the desired homogeneous isulation is produced.

Although the use of wet tapes or broad materials rich in binder seems to be contradictory at first because the material is permeable for the impregnating resin only to a very slight degree even during a vacuum pressure impregnation, it is possible, according to the present invention, to obtain a perfect insulation sheath for high voltage purposes.

At a specific example of a coil for a 6-kilovolt dynamo-electric machine insulated according to the invention the above mentioned length $L_1$, $L_2$, and $L_4$ measured in centimeters: $L_1 = 100$, $L_2 = 100$ and $L_4 = 5$. The wet tape 4 consisted of a carrier material of glass-silk and fine mica with 40 percent by weight of an epoxy resin as a binder. The wet tape 4 was wound with no overlap around the conductors to nine layers. The dry tape 5 also consisted of a carrier material of glass-silk and fine mica with 4 percent by weight of an epoxy resin as a binder. The dry tape was wound with an overlap of one half around the conductors to four layers. The woven-tape 9 was made of glass-silk. The impregnating resin used was an epoxy resin, the hardening lasted for 24 hours and the hardening temperature was at 155° C.

It will be understood that the above description of the present invention is susceptible to various modifications, changes and adaptations, and the same are intended to be comprehended within the meaning and range of equivalents of the appended claims.

We claim:

1. In an insulated conductor or conductor bundle, for electrical machines in which the conductor or conductor bundle includes a first portion which is to lie within the grooves of a lamination packet of the machine and an arm portiOn which is connected to the first portion, and in which the conductor or conductor bundle is enclosed in a mica-containing insulating material, before being installed in the machine and impregnated with an impregnating resin which is subsequently hardened, the improvement wherein the insulating material provided for said first portion of the conductor or conductor bundle which is to lie within the grooves of the lamination packet of the machine includes mica which is bound with a high percentage by weight of binder, and the insulating material provided for said arm portion includes mica and from zero to at most a very small percentage by weight of binder relative to the percentage by weight of binder in the insulating material of said first portion.

2. Th insulated conductor or conductor bundle as defined in claim 1 wherein the conductor or conductor bundle further includes a discharge portion between the first portion and the arm portion, and wherein the discharge portion forms a transition zone from the insulating material having a high percentage by weight of binder to the insulating material having from zero to at most a very small percentage by weight of binder.

3. The insulation conductor or conductor bundle as defined in claim 2 wherein the insulating materials in the transition zone form offset layers with respect to each other.

4. The insulated conductor or conductor bundle as defined in claim 1 wherein a woven tape is provided between the conductor or conductor bundle and the insulating materials.

5. The insulated conductor or conductor bundle as defined in claim 1 wherein said insulating material having a high percentage by weight of binder is prepacked.

6. The insulated conductor or conductor bundle as defined in claim 1 wherein the percentage by weight of binder in said insulating material containing a high percentage of binder is between 30 and 50 percent by weight.

7. The insulated conductor or conductor bundle as defined in claim 1 wherein said insulating material containing mica and from zero to at most a very small percentage of binder contains only mica.

8. The insulated conductor or conductor bundle as defined in claim 1 wherein said insulating material containing mica and from zero to at most a very small percentage of binder contains 3–8 percent binder by weight.

* * * * *